United States Patent [19]

Kruczynski et al.

[11] Patent Number: 5,695,585
[45] Date of Patent: Dec. 9, 1997

[54] METHOD FOR WELDING BAGS TO RINGS

[75] Inventors: Adam Kruczynski; Anne Miller, both of Cambridge, United Kingdom

[73] Assignee: Chartex International Plc., London, England

[21] Appl. No.: 463,737

[22] Filed: Jun. 5, 1995

Related U.S. Application Data

[62] Division of Ser. No. 96,977, Jul. 27, 1993, Pat. No. 5,603,802.

[30] Foreign Application Priority Data

Apr. 23, 1993 [GB] United Kingdom ............... 9308453

[51] Int. Cl.$^6$ .......................................... B29C 65/02
[52] U.S. Cl. .................. 156/196; 128/844; 156/212; 156/214; 156/229; 156/267; 156/304.6; 156/308.2
[58] Field of Search ............................. 156/156, 212, 156/213, 214, 215, 229, 304.2, 304.6, 308.2, 475, 486, 569, 580, 581, 583.1, 196, 267; 425/397; 493/210, 212, 214, 215; 128/844

[56] References Cited

U.S. PATENT DOCUMENTS

| | | |
|---|---|---|
| 1,186,498 | 6/1916 | Regan . |
| 1,853,192 | 4/1932 | Benke . |
| 2,199,790 | 5/1940 | Guinzburg . |
| 2,383,352 | 8/1945 | Snyder . |
| 2,645,591 | 7/1953 | Makrauer . |
| 2,780,901 | 2/1957 | Youngblood . |
| 2,900,779 | 8/1959 | Baxter et al. . |
| 3,091,903 | 6/1963 | Kammerer . |
| 3,247,647 | 4/1966 | Koch . |
| 3,309,836 | 3/1967 | Hallowell . |
| 3,523,492 | 8/1970 | Bruce . |
| 3,586,566 | 6/1971 | Van Vleet et al. . |
| 3,671,349 | 6/1972 | Westlake . |
| 3,710,693 | 1/1973 | Marhold . |
| 3,728,200 | 4/1973 | Peyraud . |
| 3,760,563 | 9/1973 | Zimmermann . |
| 3,774,367 | 11/1973 | Lerner . |
| 3,827,683 | 8/1974 | Seborg et al. ............... 425/397 |
| 4,016,704 | 4/1977 | Fujio . |
| 4,086,117 | 4/1978 | Pearsall . |
| 4,208,857 | 6/1980 | Fujio . |
| 4,344,814 | 8/1982 | McLaren . |
| 4,468,213 | 8/1984 | Termaat . |

(List continued on next page.)

FOREIGN PATENT DOCUMENTS

| | | |
|---|---|---|
| 1136378 | 5/1957 | France . |
| 605101 | 10/1934 | Germany . |
| 2031855 | 1/1972 | Germany . |
| 2-45126 | 4/1990 | Japan . |
| 3-286837 | 12/1991 | Japan . |
| 775726 | 5/1957 | United Kingdom . |
| 1259284 | 1/1972 | United Kingdom . |
| 1509816 | 5/1978 | United Kingdom . |
| 2218666 | 11/1989 | United Kingdom . |
| WO 89/03315 | 4/1989 | WIPO . |
| WO 89/11258 | 11/1989 | WIPO . |
| WO 90/05506 | 5/1990 | WIPO . |

OTHER PUBLICATIONS

Modern Packaging Encyclopedia, 1970, pp. 235, 236.
Farkas, *Heat Sealing*, pp. 26–52, 1964.

*Primary Examiner*—Steven D. Maki
*Attorney, Agent, or Firm*—Mc Donnell Boehnen Hulbert & Berghoff

[57] ABSTRACT

An apparatus for welding a reinforcing member to a bag-like device or contraceptive device is disclosed. The apparatus includes at least one hollow mandrel. The hollow mandrel has an outer surface with an annular groove for holding the reinforcing member. The apparatus has a means for applying a closed end of the bag-like device into the hollow mandrel and an open end of the bag-like device over the hollow mandrel at the outer surface with the annular groove for holding the reinforcing member. The apparatus also includes a welding device for welding the reinforcing member to the bag-like device. A method for welding the reinforcing member to a bag-like device is also disclosed.

8 Claims, 5 Drawing Sheets

U.S. PATENT DOCUMENTS

| | | |
|---|---|---|
| 4,555,377 | 11/1985 | Whiteside et al. ............... 425/397 |
| 4,583,351 | 4/1986 | Fallas . |
| 4,661,185 | 4/1987 | Kobiella . |
| 4,776,921 | 10/1988 | French . |
| 5,044,774 | 9/1991 | Bullard et al. . |
| 5,074,314 | 12/1991 | Wilson . |
| 5,098,755 | 3/1992 | Tanquary et al. . |
| 5,199,444 | 4/1993 | Wheeler . |
| 5,207,963 | 5/1993 | Grace ............................. 425/397 |

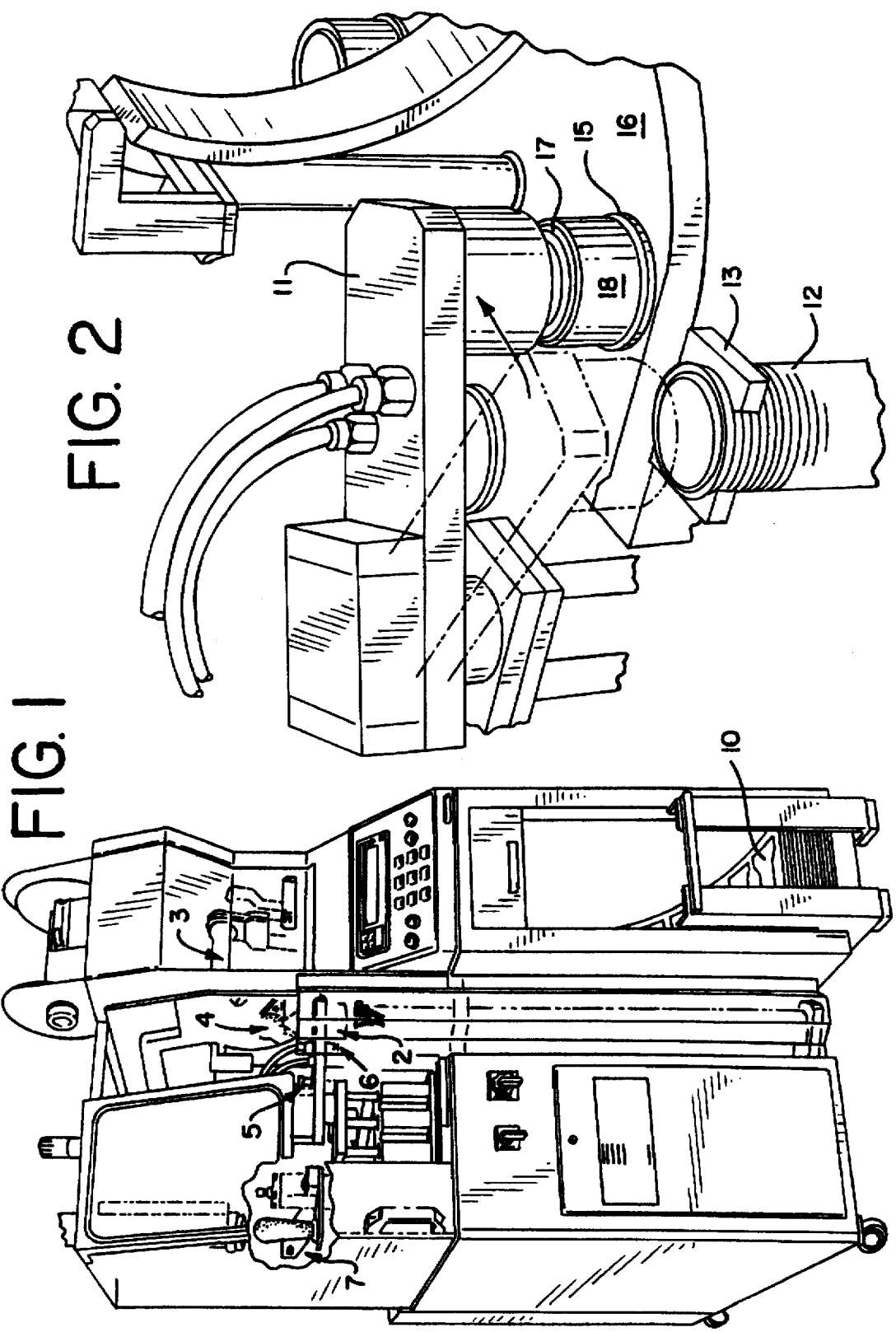

METHOD FOR WELDING BAGS TO RINGS

This application is a division of U.S. application Ser. No. 08/096,977, filed Jul. 27, 1993, now U.S. Pat. No. 5,603,802.

BACKGROUND OF THE INVENTION

1. Field of the Invention

The invention relates to a method and apparatus for forming plastic articles. Specifically, the invention relates to a method and apparatus for welding a semirigid bead to two sheets of plastic film.

2. Description of Related Art

Plastic articles made from two or more sheets or plies of plastic material are commonly manufactured for use as bags, gloves, and other devices. Many of these plastic articles have rims or beads molded or attached to their open ends. When the plastic articles are used as medical devices, their method and apparatus for manufacture must provide a consistently high quality article that does not tear at the joinder of the film with the bead and that is not abrasive when rubbed against the skin.

U.S. Pat. No. 2,900,779 to Baxter et al. discloses a tool for opening and expanding the mouth of a flexible receptacle. The device of this patent assembles a "supporting neck ring" to a "flexible and somewhat stretchable film material." This device is not designed to open a multiple ply plastic article and also apply it over the ring before welding the two elements together.

U.S. Pat. No. 3,247,647 to Koch discloses an applicator device. The device of this patent applies a bag over a rigid tubular holder to form a baby bottle. This device does not apply a multiple ply plastic article over a ring before welding the two elements together.

The industry lacks a high speed method and apparatus for applying a bead or ring to an open end of a multiple ply plastic article such as a bag or contraceptive device.

SUMMARY OF THE INVENTION

The invention includes an apparatus for welding a reinforcing member to a bag-like means. The apparatus includes at least one hollow mandrel, the hollow mandrel has an outer surface with an annular groove for holding the reinforcing member. The apparatus has a means for applying a closed end of the bag-like means into the hollow mandrel and an open end of the bag-like means over the hollow mandrel at the outer surface with the annular groove for holding the reinforcing member. The apparatus, also, includes a means for welding the reinforcing member to the bag-like means.

The invention is, also, a process of producing collapsible bag-like means having the following steps. Placing a reinforcing member into an annular groove on an outer surface of at least one hollow mandrel first occurs. Opening an open end of the bag-like means with a means for opening having a gas injector means for injecting gas into the open end of the bag-like means follows.

Gripping the opened end of the bag-like means at a plurality of sites on a circumference of the open end of the bag-like means follows. Extending the open end of the bag-like means occurs. Applying a closed end of the bag-like means into the hollow mandrel and the open end of the bag-like means over the hollow mandrel at the outer surface with an annular groove for holding the reinforcing member follows. Lastly, welding the reinforcing member to the bag-like means is performed.

BRIEF DESCRIPTION OF THE DRAWINGS

The invention can be performed in various ways and one specific embodiment will now be described by way of example with references to the accompanying drawings in which:

FIG. 1 is a general arrangement view of apparatus according to the invention;

FIG. 2 shows in more detail an O-ring pick up arrangement;

DESCRIPTION OF THE PREFERRED EMBODIMENTS

Figure 3:
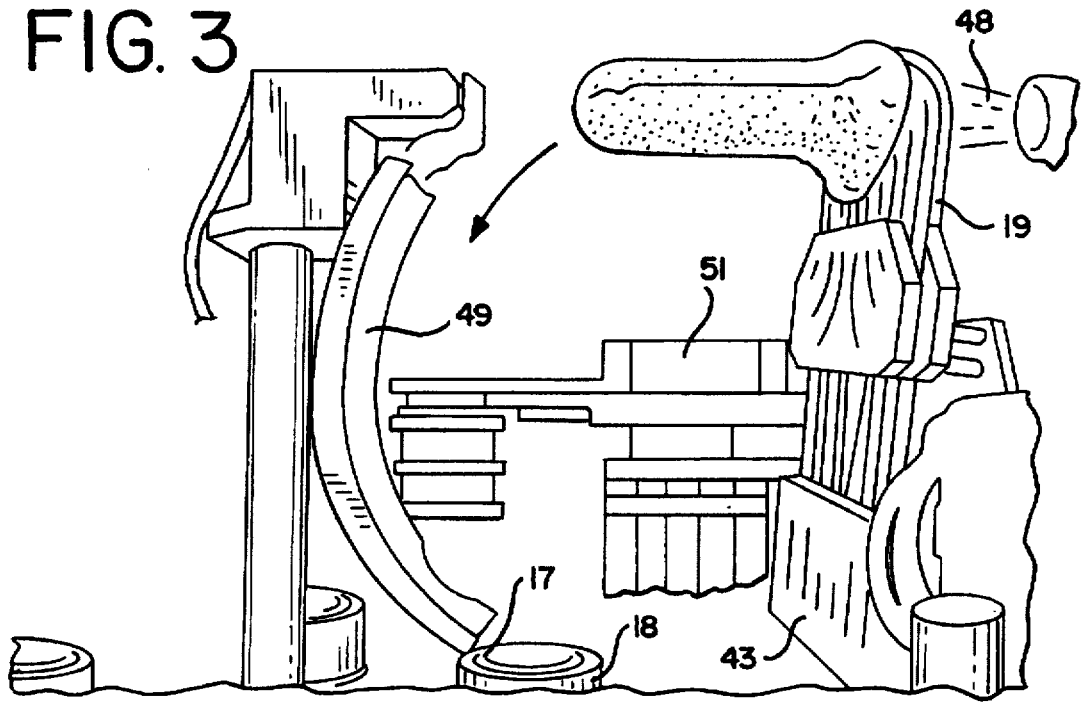
FIG. 3 shows a bag-like means about to descend down a chute to an O-ring weld station.

FIG. 1 illustrates a general arrangement and the numbers shown in the arrows correspond to the arrangement shown in FIGS. 2 to 7 described more fully below. In FIG. 1, there is shown at 10 a series of bag-like means attached to backing paper.

FIG. 2 illustrates an O-ring pick head 11. The O-ring pick head 11 is arranged to pick an O-ring from the top of a stack of O-rings in an O-ring feeder tube 12. The O-ring pick head in this position is shown in dashed or broken lines and moves downwardly on the top of the stack of O-rings. An O-ring gripper 13 releases a single O-ring and the O-ring pick head 11 then has suction applied to it. The suction applied to the O-ring pick head 11 causes the O-ring to be sucked or pulled by a vacuum into a corresponding groove in the underside of the O-ring pick head 11. The O-ring gripper 13 contacts and retains the remaining O-rings on the tube. The arrangement is such that the O-rings are raised upwardly so that the O-ring gripper 13 can release the O-rings one at a time. When the O-ring pick head 11 has lifted the top ring, the O-ring pick head 11 then rotates so as to be over the first position of a four position rotary turntable 16. The four positions of the rotary turntable 16 are indexed at 90° to one another.

In the first position, the O-ring pick head 11 moves downwardly to press an O-ring into an annular groove 17 in a pot 18 located on the rotary turntable 16. The pot 18 is open at both ends in the preferred embodiment. Suction is then applied to the annular groove 17 at the top of the pot 18. At the same time, the suction is terminated from the O-ring pick head 11 and a supply of compressed air is supplied through the O-ring pick head 11 to assist in transferring the O-ring from the O-ring pick head 11 to the pot 18 on the rotary turntable 16. Sensor means (not shown) can be present for verifying the presence of an O-ring on the annular groove 17. If no O-ring is on the annular groove 17, the O-ring pick head 11 returns to transfer another O-ring. When an O-ring has been satisfactorily placed in the annular groove 17 at the top of the pot 18, the O-ring pick head 11 swings away to return to the position above the O-ring feeder tube 12 in preparation for the start of another cycle.

The rotary turntable 16 rotates 90° to transfer the pot 18 having an O-ring to the "bag and O-ring welding station". At the bag and O-ring welding station, a bag-like means is supplied. The bag-like means, as shown at 10 in FIG. 1, are adhered to a backing paper and are spaced apart from one another. The bag-like means are adhered along the edge of their open end to the backing paper and are open at their right hand sides (according to the embodiment shown in FIG. 1) so as to form an entrance to each bag-like means. An eight finger gripper assembly 19 (explained in detail below) is adapted to grip the open end of a bag-like means.

Figure 4:
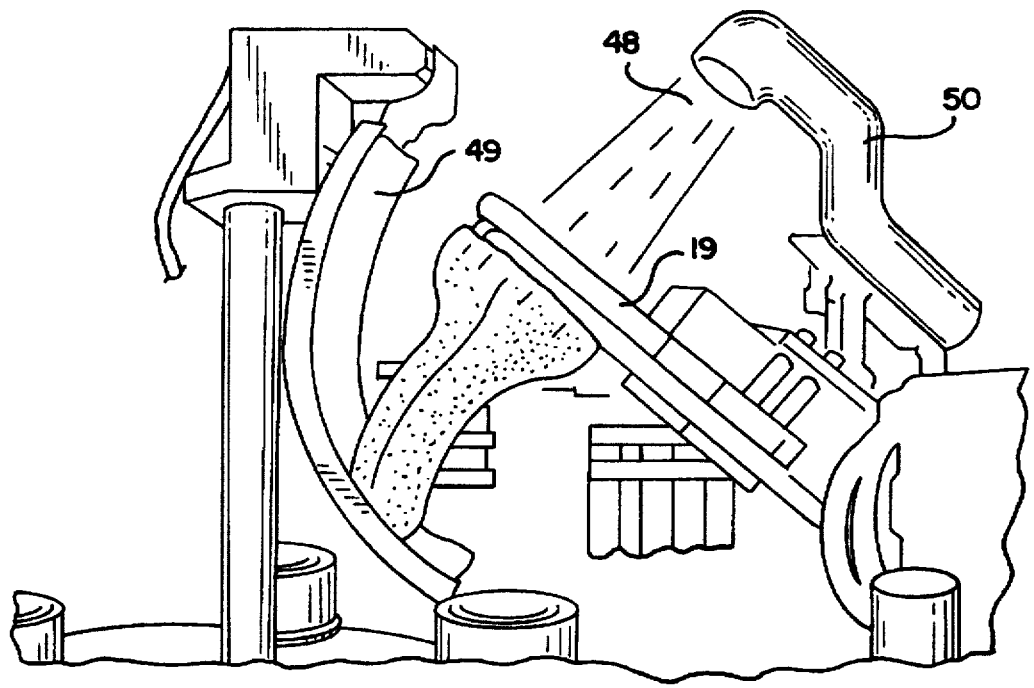
FIG. 4 shows the bag-like means during its descent.
Figure 5:
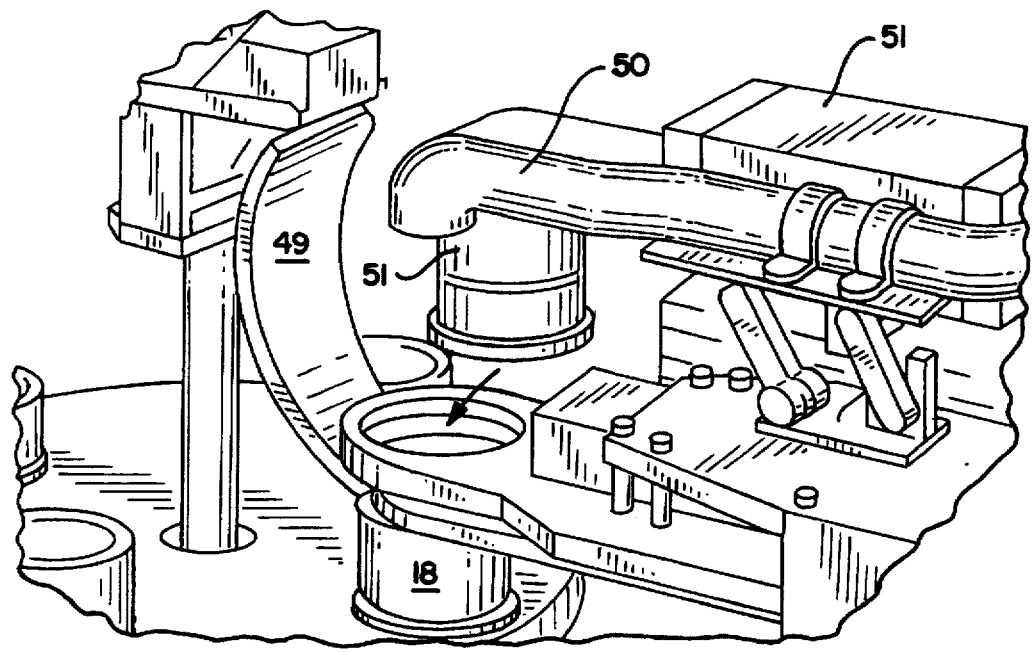
FIG. 5 shows the welding head about to move into position to weld the ring to the bag-like means.

FIGS. 3 and 4 illustrate the gripper assembly 19 with a bag-like means attached thereto. In order to arrive at this position, the gripper assembly 19 is pivoted into a position approximately 10° past the vertical. The backing paper with an attached bag-like means is indexed or moved into a curved trough. The curved trough bends the two plies of plastic film of the bag-like means so that the lower layer of film, that is adhered to the backing paper, is stretched about the perimeter of the curved trough. The upper layer of plastic film is puckered or rippled. The rippled separation between the two plies of plastic film opens the bag-like means. A high pressure blast of air is applied to the open end of the bag-like means to inflate the bag-like means and the gripper assembly 19 pivots forward approximately 10° to place the roller fingers just inside the mouth of the inflated bag-like means. A double acting twin rod cylinder (not shown) drives the actuator plate 43 downwardly and as described below. The roller fingers assume a circular shape and in so doing grip and stretch the mouth of the bag-like means causing the bag-like means to release from the backing paper.

Bag-like means strip air jets direct high pressure gas or air to ensure that the nose or closed end of the bag-like means is also released from the backing paper. With the bag-like means still inflated, the gripper assembly 19 pivots forward and the nose of the bag-like means is guided into and slides down a pivoted curved guide chute 49 and into the pot 18 on the rotary turntable 16 with the O-ring positioned in the annular groove 17.

During this movement of the gripper assembly 19, air is continuously supplied by an air jet 48. The force of the air jet 48 pivots with the gripper assembly 19 to keep the bag-like means inflated. The guide chute 49 then pivots back to make room for a weld head 51, shown in FIG. 5, to move into position by pivoting from the side and then moving downwardly onto the top of the pot 18.

The weld head 51 then presses down through the hole in the back of the gripper assembly 19 formed by the movement of the arms and fingers trapping the plastic film of the stretched bag-like means between a heated plate and the O-ring beneath. Welding of the plastic film to the O-ring is performed for a short time of about 0.3 seconds at a temperature of about 140° C. + or −10° C. The bag-like means is located over the pot 18 such that the plastic film of the bag-like means overlaps and descends down the outside of the pot 18.

Figure 6:
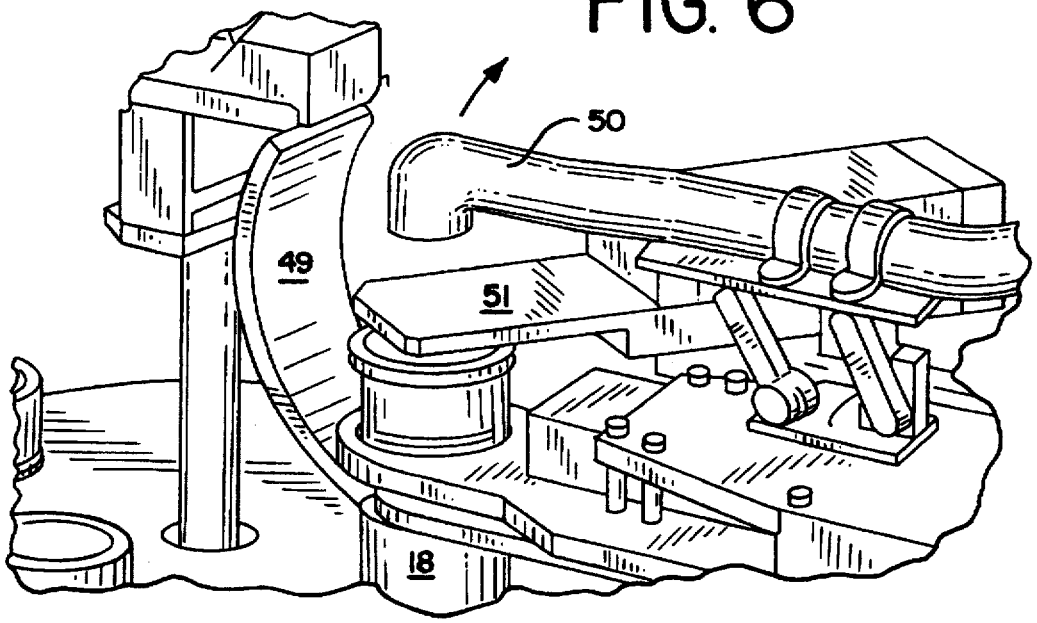
FIG. 6 shows the welding head in position.
Figure 7:
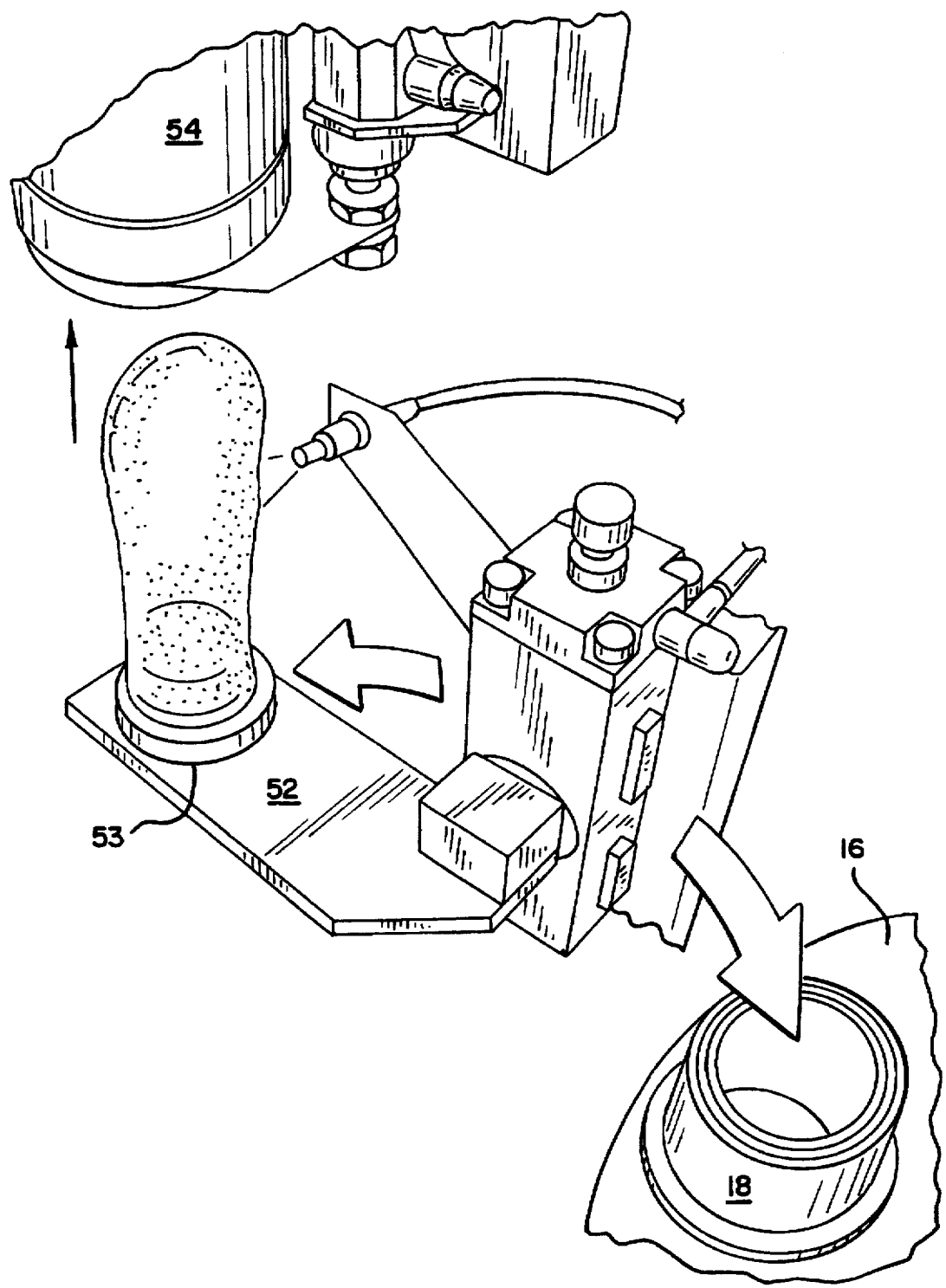
FIG. 7 shows the completed bag-like means ready for removal.

FIG. 6 illustrates the position of the elements during the welding procedure. The gripper assembly 19 is lowered still further. The further lowering of the gripper assembly 19 assists in stripping the annulus of excess film formed by the overlap of plastic film over the outer periphery of the O-ring and pot 18. The heat of the welding procedure causes weakness in the plastic film so that the gripper fingers can easily strip the surplus plastic film and a neat weld is formed without any surplus plastic film attached to the weld.

The weld head 51 then lifts and pivots back to the side of the machine and the gripper assembly 19 begins to pivot back towards the rest position. At approximately 45° the gripper assembly 19 pauses and the curved guide chute 49 pivots forward to shield and protect the recently welded bag-like means in the rotary turntable 16. The double acting twin rod cylinder then lifts the actuator plate 43 causing the gripper fingers to contract and release the bag-like means. While this procedure is occurring, high velocity air jets cause the annulus of excess film to be blown away from the pot 18 and deposited to scrap. The gripper assembly 19 then completes the return to the initial position of about 10° past the vertical.

The four position rotary turntable 16 then moves 90° to a spare station and then through a further 90° taking the newly formed bag-like means to a product removal station. At the product removal station, a vacuum through the annular groove 17 of the pot 18 is terminated. A product removal head 52 holds the welded product and pivots through a 180° arc. A vacuum is initiated through an annulus 53 on the product removal head 52, thus, enabling the product removal head 52 to pick the newly formed welded bag-like means from the rotary turntable 16. The welded bag-like means and removal head 52 rotate through a 180° arc so that the welded bag-like means can be inverted under a transfer tube. The welded bag-like means is then inflated and the vacuum through the annulus 53 to the product removal head 52 is terminated to cause the welded bag-like means to be launched up the transfer tube. The welded bag-like means is pushed by various air jets along the transfer tube 54 and into platens (not shown). The platens can be used to transfer the welded bag-like means to a testing station.

Figure 8:
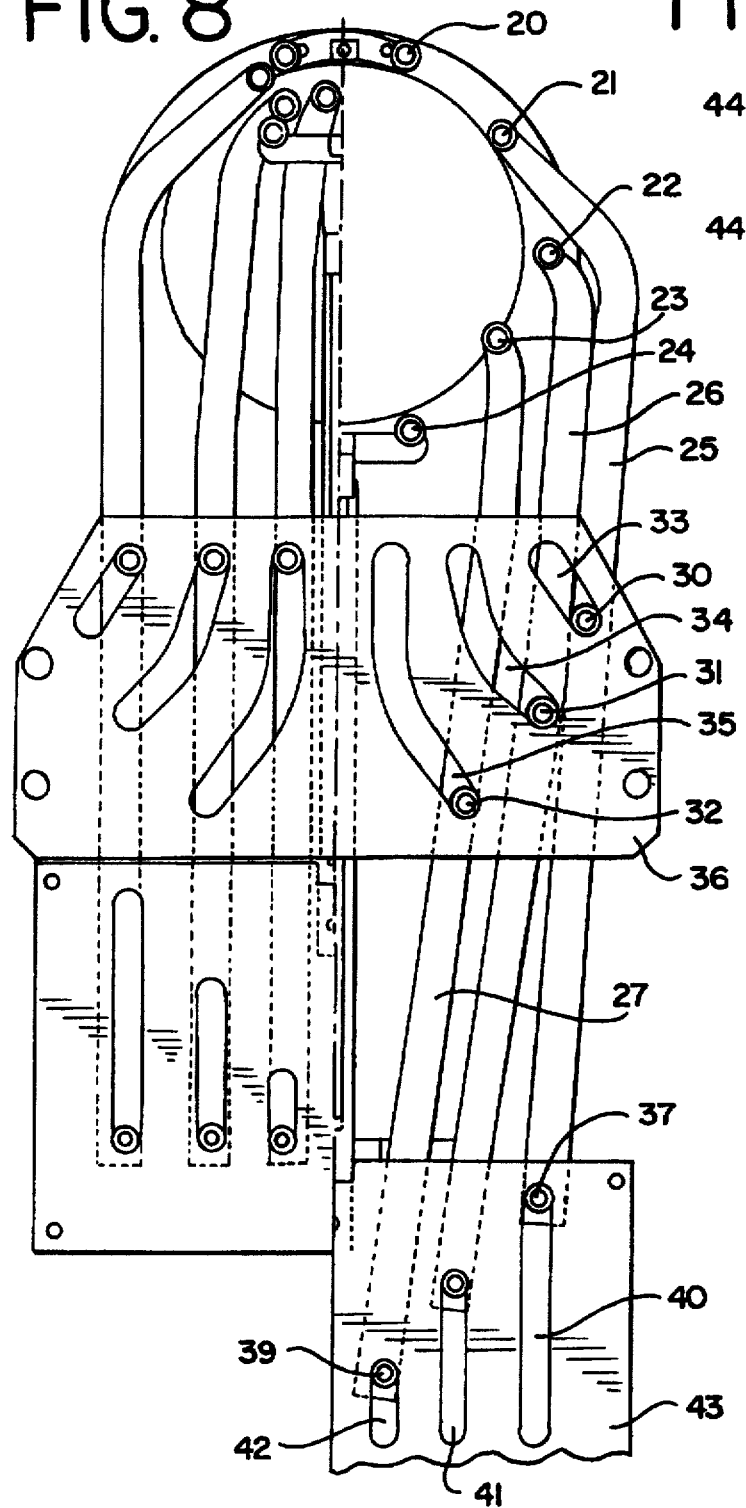
FIG. 8 shows the plan view a gripper finger assembly.
Figure 9:
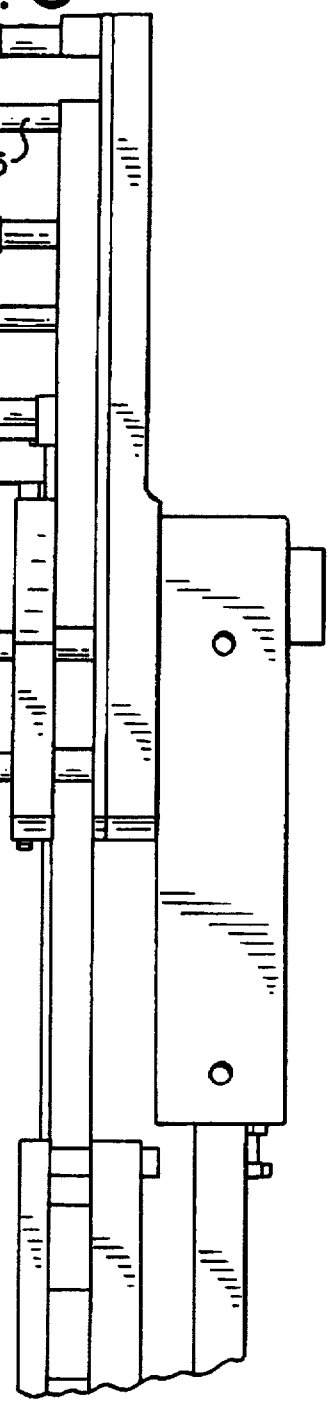
FIG. 9 is a side view of FIG. 8.
Figure 10:
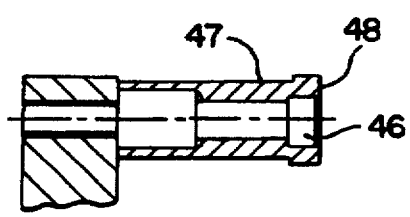
FIG. 10 is a detail view of a gripper finger.

FIGS. 8, 9, and 10 illustrate the gripper assembly 19 in detail. The gripper assembly 19 comprises two fixed finger rollers 20 and two sets of movable finger rollers 21, 22, 23, and 24 which are mounted on the ends of two sets of arms on each side of a center line running through the gripper assembly 19. Each set has arms 25, 26, and 27 with pins 30, 31, and 32 extending through slots 33, 34, and 35 in a cam plate 36. The lower ends of the arms are connected by further pins 37, 38, and 39 through slots 40, 41, and 42 through an actuator plate 43. The actuator plate 43 is movable between upper and lower positions as shown in the "split views" of the left and right hand sides, respectively, of FIG. 8.

The lower pin 24 is mounted on a rod which is directly connected to the actuator plate 43. Each of the gripper fingers have rollers 44 and these can be seen in FIG. 9. FIG. 9 illustrates the rollers 44 mounted on a fixed pin 45. The fixed pin 45 is mounted on the end of the respective arm and has an enlarged head 46. The enlarged head 46 serves to retain a roller sleeve 47. The roller sleeve 47 is rotatable on the pin 45. The roller sleeve 47 has an enlarged shoulder 48 at its outer end. In operation the gripper fingers move from a first position where they are all grouped together into a second position where they form a circular shape caused by the cam plate or actuator plate 43 moving downwardly.

The invention includes a process for welding a reinforcing member to a bag-like means. The process involves placing a reinforcing member into an annular groove on an outer surface of at least one hollow mandrel. Then, opening an open end of the bag-like means with a means for opening having a gas injector means for injecting gas into the open end of the bag-like means is performed. Gripping the opened end of the bag-like means at a plurality of sites on a circumference of the open end of the bag-like means occurs. Extending the open end of the bag-like means and applying a closed end of the bag-like means into the hollow mandrel and the open end of the bag-like means over the hollow mandrel at the outer surface with an annular groove for holding the reinforcing member is performed. Welding the reinforcing member to the bag-like member follows.

The process can further comprise ejecting the welded bag-like means from the mandrel. The process step of gripping can be performed by a plurality of prongs. The prongs are positionable within the open end of the bag-like means at individual sites on the circumference of the open end of the bag-like means. The step of extending the open end of the bag-like means can be performed by a cam member whereby operation of the cam member positions the prongs in one of two conditions. The two conditions are a first condition wherein the prongs are gathered together in a substantially linear position for insertion into the opened open end of the bag-like means. A second condition can be one wherein the prongs are separated from one another to extend the open end of said bag-like means.

We claim:

1. A process for welding a reinforcing member to bag-means comprising:

placing a reinforcing member into an annular groove on an outer surface of at least one hollow mandrel;

opening an openable end of said bag means with a means for opening, the means for opening having a gas injector means for injecting gas into said openable end of said bag means;

gripping said opened end of said bag means at a plurality of sites on a circumference of said opened end of said bag means;

extending said opened end of said bag means;

applying a closed end of said bag means into said hollow mandrel and said opened end of said bag means over said hollow mandrel at said reinforcing member; and welding said reinforcing member to said bag means.

2. The process for welding a reinforcing member to a bag means of claim 1 further comprising:

ejecting said welded bag means from said mandrel.

3. The process for welding a reinforcing member to a bag means of claim 1 wherein:

said gripping is performed by inserting a plurality of prongs into the opened end of said bag means, said prongs are positionable within said opened end of said bag means at individual sites on said circumference of said opened end of said bag means; and said extending of said opened end of said bag means is performed by separating said prongs from one another to extend said opened end of said bag means.

4. The process for welding a reinforcing member to a bag means of claim 1 further comprising:

rotating said at least one mandrel on a turntable, wherein said turntable rotates said mandrel to operational positions for said placing, said applying, and said welding.

5. The process for welding a reinforcing member to a bag means of claim 4 wherein said welding includes applying pressure to said bag means and said reinforcing member.

6. The process for welding a reinforcing member to a bag means of claim 1 wherein said welding includes heating said bag means and said reinforcing member.

7. The process for welding a reinforcing member to a bag means of claim 1 wherein said welding includes applying pressure to said bag means and said reinforcing member.

8. The process for welding a reinforcing member to a bag means of claim 1 further comprising:

removing surplus material of said opened end of said bag means extending beyond said welded reinforcing member.

* * * * *